Sept. 1, 1931.     F. N. MOERK     1,820,920
METHOD OF TREATING NITROGENOUS WASTE MATERIALS
Filed June 1, 1923
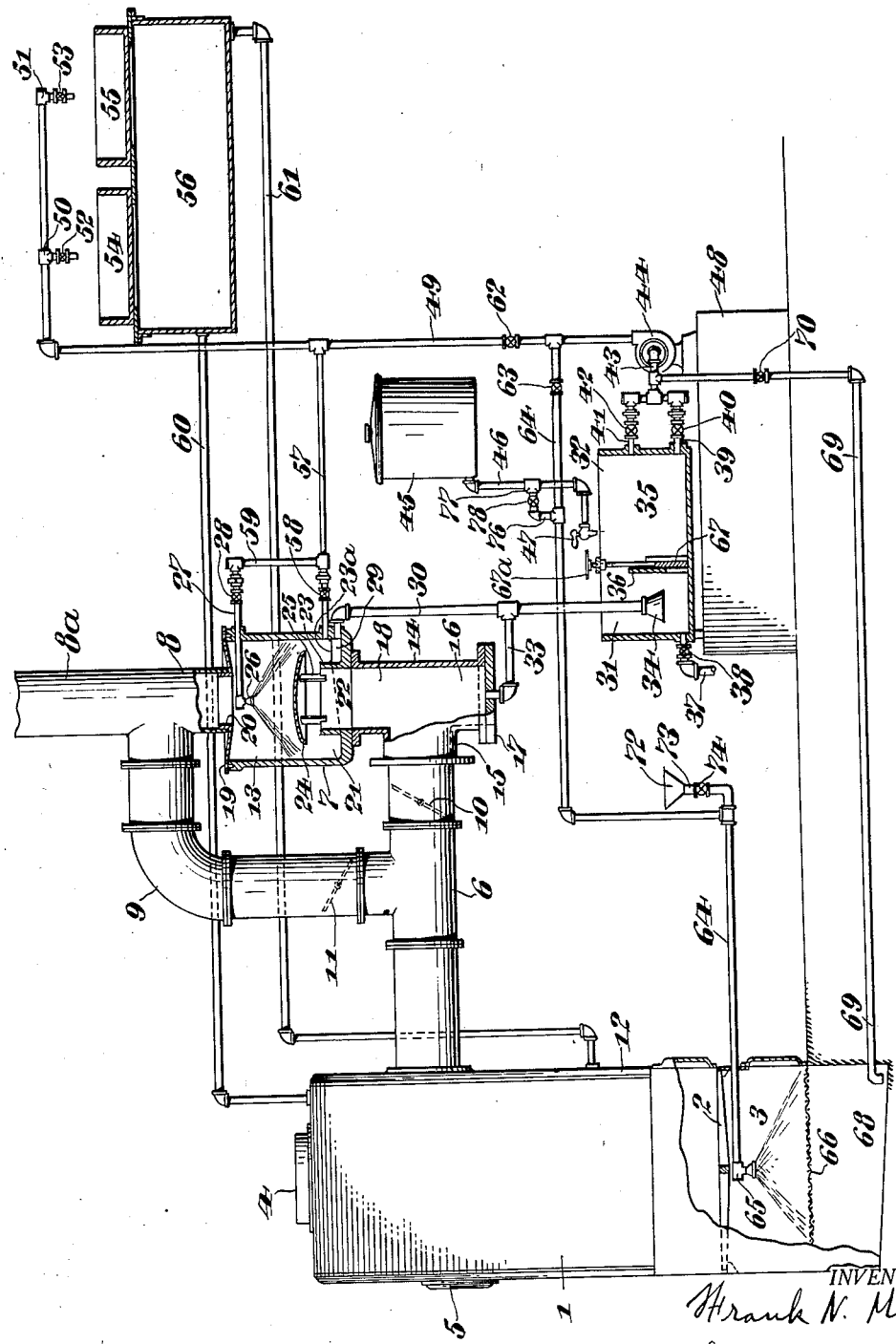
INVENTOR.
Frank N. Moerk
BY Cornelius D. Ehret.
his ATTORNEY.

Patented Sept. 1, 1931

1,820,920

UNITED STATES PATENT OFFICE

FRANK N. MOERK, OF PHILADELPHIA, PENNSYLVANIA, ASSIGNOR OF ONE-HALF TO EMILY Q. LANDRETH, OF PHILADELPHIA, PENNSYLVANIA

METHOD OF TREATING NITROGENOUS WASTE MATERIALS

Application filed June 1, 1923. Serial No. 642,761.

My invention relates to a method of and apparatus for recovering products such as ammonia, potash and phosphate from sewage sludge, sewage screenings, garbage, slaughter house waste, and other waste nitrogenous materials.

My invention is directed more particularly to the recovery of valuable products from waste material such as sewage, garbage, and the like in connection with the disposal of such materials to render them harmless, although the process may also be used to recover such products from nitrogenous materials of any character. The products recovered from waste materials will, in many cases, pay for the cost of the disposal process.

Several methods are at present employed for disposing of these waste materials. One method is to cook or distill them and wash the distillation gases with an absorbtive liquid to render them harmless to animals and vegetation and to recover ammonia therefrom. Another method is to incinerate the waste material and scrub the incineration gases, to precipitate insoluble matter, and to wash the gases with an absorbtive liquid such as sulphuric acid, to absorb soduble constituents therefrom, the ash, including both its soluble and insoluble constituents being discarded or utilized as a road building material or as a filler.

One object of my invention is to provide an improved apparatus and method for disposing of waste materials of the character referred to, by freeing them of their objectionable properties and recovering commercial products therefrom.

A further object of my invention is to recover commercial products from both the ashes and the gases and vapors of incinerated nitrogenous material, the products recovered from the gases and the ash, respectively, being utilizable either separately or in combination, as fertilizers or otherwise.

This invention is, in part, a continuation of my application Serial Number 368,602, filed March 25, 1920, and is in part an improvement upon the method and apparatus therein described.

For an illustration of one of the many forms in which my apparatus may be embodied, and an understanding of a typical method of carrying out my process, reference is to be had to the accompanying drawing, in which:

The figure is a vertical elevation, parts being in section, of a plant for incinerating sewage sludge and the like and recovering ammonia from the gases and soluble constituents from the ashes.

In the drawing, 1 is an incinerator having a grate 2, and an ash pit 3. At the top of the incinerator is a charging hopper 4, and in the side wall is an opening provided with a door 5 for access to the interior of the incinerator. Flue 6 leads from the incinerator to the scrubbing tower 7. From the top of the scrubbing tower, flue 8 leads to a stack 8a. A flue by-pass 9 leads from flue 6 to flue 8. Flues 6 and 9 are controlled by valves or dampers 10 and 11.

Incinerator 1 is provided with a water jacket 12, which serves to cool and preserve the walls of the incinerator, and furnishes hot water for purposes of evaporation, as hereinafter described. Scrubbing tower 7 may be of any suitable construction for bringing the gases from the incinerator into intimate contact with an absorption material. The form shown is found suitable for this purpose, and comprises an upper absorption chamber 13 and a lower condensation chamber 14 of smaller diameter. Lower chamber 14 is in the form of a T having one arm 15 connected to flue 6. Downwardly extending arm 16 is closed by a cover 17. Upwardly extending arm 18 is open and connects with upper chamber 13. The chamber 13 is cylindrical and is provided with a cover 19 having a central opening provided with flange 20, which fits into flue 8. The lower end of the chamber 13 is turned inwardly and upwardly, forming an annular channel 21 surrounding the central opening 22, which joins arm 18 of chamber 14. The inner wall of channel 21 is the flange 23, which flange is also the wall of opening 22. Above opening 22 and spaced from flange 23 and the walls of chamber 13 is the baffle or shield 24 overhanging the flange 23. Baffle 24 is suitably supported, for instance, by means of legs 25 resting on flange 23.

In chamber 13, above baffle 24 and below opening 20, is the jet or spray nozzle 26, of any suitable type, for spraying a scrubbing and absorbing agent into contact with gases or vapors passing through chamber 13. Nozzle 26 is supplied with absorbing agent through pipe 27 controlled by valve 28, as hereinafter described. Channel 21 is in the form of a helix, sloping downwardly from the highest point at 23a to the lowest point at 29 from which charged liquor flows through pipe 30 to sludge chamber 31.

Plate 17 on the lower end 16 of chamber 14 is provided with an opening in which is connected a drain pipe 33 leading to pipe 30. The delivery end of pipe 30 is provided with an enlarged funnel-shaped end 34 to deliver liquid into sludge chamber 31 without agitation of the contents thereof.

Sludge chamber 31 comprises a part of container 32 on a foundation or base 48, the other part being a chamber for clear separated liquid 35. Sludge chamber 31 and chamber 35 are separated by wall 36 extending from the bottom of container 32 to a level below the top of the walls thereof. Sludge chamber 31 is provided at or near its bottom with a sludge draw-off pipe 37, controlled by valve 38. Chamber 35 is provided at or near its bottom with pipe 39 controlled by valve 40 and near its top with pipe 41 controlled by valve 42. Pipes 41 and 39 connect through pipe 43 with the intake of pump 44.

The chemical tank 45 delivers absorption liquid through pipe 46 controlled by valve 47 into the container 32.

The pump 44 discharges through pipe 49 and pipes 50 and 51 controlled by valves 52 and 53, delivering to crystallizing pans 54 and 55, which pans rest on and are heated by hot water bath 56. The pipe 57, controlled by valve 58, connects the discharge of pump 44 to channel 21. Branch pipe 59 connects the discharge of pump 44 through pipes 49 and 57 with pipe 27 leading to spray nozzle 26.

When a valve 62 in pipe 49 is closed and a valve 63 in pipe 64 is opened, the pump 44 may discharge through the pipe 64 and the spray nozzle 65 disposed above a screen 66 in the ash pit 3, to leach ashes which may have passed through the grate 2 to such screen. Ordinarily, the liquid supplied through the pipe 64 to leach the ash will be drawn from the tank 32 through the pipe 39. A gate or slide valve 67 operated by a handle 67a is provided in the partition 36 of the tank 32 so that it may be opened when desired to permit the sludge or sediment to be carried by the leaching liquid to the ash pit 3 and there filtered out of such liquid by the clinker, or nonsoluble constituents, of the ash. If it is desired to remove the sludge from the tank 32 independently of the leaching liquid, such sludge may be withdrawn through the pipe 37 as above explained and either added to the clinker from the ash pit 32, or added to the leaching liquid after such liquid has passed through the ash and been concentrated, in order to utilize the ammonia contained in such sludge as a part of the fertilizer material.

A chamber 68 is provided to receive the leaching liquid and the soluble ash constituents contained therein. This leaching liquid may be periodically drawn off through a pipe 69 and a valve 70 by the pump 44 and passed through the ashes one or more times and then discharged through pipe 49 into one of the evaporating pans 54 and 55.

Liquid other than that from the tank 32 may be employed to leach the ashes, and I provide a funnel 72 and pipe 73 controlled by a valve 74, through which such other liquid may be introduced into the pipe 64. Leaching liquid may also be directed through the pipe 64 and thence to the spray device 65, directly from the tank 45, by means of the pipes 76 and 77 which are provided with a valve 78.

The water bath 56 is supplied with hot water from jacket 12 of incinerator 1 through pipe 60, connected at or near the top of the jacket, and water from bath 56 is returned to jacket 12 through pipe 61 connected to jacket 12 at or near its bottom.

It is to be understood that in place of water jacket 12 the incinerator may be provided with a heating coil within the incinerating chamber, or water bath 56 may be supplied with hot water from any source other than from the incinerator. It is also to be understood that any suitable heating means may be substituted for water bath 56.

The operation is as follows:

Waste material, such as sewage sludge, screenings, garbage and the like, and particularly nitrogenous waste material, is charged into incinerator 1 through charging hopper 4, and incinerated in the well known manner. Gases and vapors from the incinerator pass through flue 6 to chamber 14 of scrubbing tower 7. In chamber 14 some dust and condensed liquids separate, collecting in 16 and flowing through pipes 33 and 30 to sludge chamber 31. The gases pass upward from chamber 14 under baffle 28 and come in contact with a spray of sulphuric acid or other absorption liquid from spray head 26, and the soluble constituents, particularly ammonia, are absorbed. The purified gases then pass through flue 8 to the stack.

Absorption liquid carrying the absorbed material collects in channel 21 and flows through pipe 30 to the sludge chamber 31 where the solid materials settle and are drawn off either through the pipe 37 or through pipes 39 and 64 as above explained.

Additional absorption reagent, as sulphuric acid, is added to the absorption liquid in tank 32 from tank 45 through pipe 46 to maintain the strength or acidity of the liquid. Clear liquid flows from chamber 31 over wall 36 to chamber 35. The liquid then flows through pipe 41 to pump 44 through pipes 49, 57, 59 and 27 to spray head 26, again passing through the scrubbing tower 7 and absorbing further quantities of ammonia. As the process continues the absorption liquid becomes more and more concentrated and is from time to time directed either through pipes 39 and 49 to the crystallizing pans 54 and 55, or through pipe 64 to the ash pit 3, depending upon whether or not it is desired to utilize the concentrated liquid separately from the soluble constituents of the ash. I may either employ only a portion of such liquid, or some other liquid, to leach the ash, or utilize all of the concentrated liquid as an absorbing agent for the soluble constituents of the ash and thereby combine the absorbed constituents of the incineration gases with the soluble constituents of the ash.

When sulphuric acid is employed as the absorption liquid, concentration thereof independently of the ash results in crystals comprising impure ammonium sulphate, while if the concentrated liquid is passed through the ash, it will also contain the potash and phosphate absorbed from the ash by it. The clinker or insoluble material may be used as a road building material or otherwise disposed of and the soluble constituents of either the gas or ash, or a combination of such constituents may be evaporated and employed as a fertilizer or in some other manner.

Or the concentrated absorption liquid carrying material absorbed from the gases may be added directly to the ash from the incinerator. If added while the ash is hot, the heat of the ash evaporates the liquid, producing a dry intimate mixture of ash and absorbed material. The sludge from chamber 31 carries some ammonium salts and may advantageously also be added to the ash from the incinerator.

The channel 21 may from time to time become choked with a sludge of solid material scrubbed from the gases, and whenever this occurs valves 28, 50 and 51 are closed and valve 58 opened, and liquid is pumped through pipes 49 and 57 into channel 21 to flush out the collected material.

Sulphuric acid, more or less diluted, is preferably employed as the absorption agent. My invention is not, however, limited to the use of sulphuric acid. Many other materials, including the strong mineral acids, capable of absorbing impurities from the waste gases of the incinerator, particularly ammonia, may be employed.

The scrubbing chamber 7 may be made of vitrified material or lead lined, or any other suitable material capable of withstanding the action of acid, and the piping and tanks 45 and 32 and crystallizing pans 54 and 55 and pump 44 may be lead lined or made of materials capable of withstanding the action of acids and other materials to which they are subjected.

The form of apparatus disclosed is merely illustrative, it being understood that many changes and modifications may be made therein within the scope of my invention as defined in the appended claims.

What I claim is:

1. The process of manufacturing a fertilizer, which comprises incinerating nitrogenous material, washing the resulting gases with an absorptive liquid, leaching the resulting ash with the same liquid utilized for washing, and recovering absorbed material from said liquid.

2. The process which comprises incinerating nitrogenous material, bringing an absorptive liquid into contact with the resulting gases to simultaneously scrub said gases and absorb soluble constituents therefrom, and passing said absorptive liquid through the resulting ash while laden with material absorbed from said gases.

3. The process of recovering soluble constituents from nitrogenous material, which comprises incinerating said material, bringing absorptive liquid into contact with the resulting gases to simultaneously scrub said gases and absorb soluble constituents therefrom, passing said absorptive liquid through the resulting ash while laden with material absorbed from said gases, and recovering from said liquid the constituents of said gas and said ash absorbed thereby.

4. The process which consists in incinerating nitrogenous material, washing the incineration gases with a liquid to absorb soluble constituents therefrom and precipitate the insoluble constituents thereof, and passing said liquid together with said insoluble material into contact with the incineration ash to filter said liquid.

In testimony whereof I have hereunto affixed my signature this 31st day of May, 1923.

FRANK N. MOERK.